US012754887B1

(12) United States Patent
Singh et al.

(10) Patent No.: US 12,754,887 B1
(45) Date of Patent: Oct. 6, 2026

(54) AUTOMATIC IMPLEMENTATION OF ATTRIBUTES FOR USE IN ENTITY RESOLUTION

(71) Applicant: INTERNATIONAL BUSINESS MACHINES CORPORATION, Armonk, NY (US)

(72) Inventors: Neeraj Ramkrishna Singh, Bangalore (IN); Shettigar Parkala Srinivas, Bangalore (IN); Soma Shekar Naganna, Bangalore (IN); Trent A. Gray-Donald, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/171,932

(22) Filed: Apr. 7, 2025

(51) Int. Cl.
*G06F 16/23* (2019.01)
*G06F 16/21* (2019.01)

(52) U.S. Cl.
CPC ............ *G06F 16/211* (2019.01); *G06F 16/23* (2019.01)

(58) Field of Classification Search
None
See application file for complete search history.

(56) References Cited

U.S. PATENT DOCUMENTS 5,852,820 A 12/1998 Burrows
6,907,422 B1 6/2005 Predovic
8,037,050 B2 * 10/2011 Oliver ............... G06F 16/24568 707/706
11,360,950 B2 6/2022 Harrison et al.
11,397,715 B2 7/2022 Parkala Srinivas et al.
11,768,860 B2 9/2023 Saha et al.
11,836,146 B1 12/2023 Pathak et al.
2008/0215546 A1 9/2008 Baum et al.
2012/0036130 A1 * 2/2012 Light ...................... G06F 16/20 707/769
2013/0346540 A1 * 12/2013 Dean ..................... G06F 16/211
2018/0089188 A1 3/2018 Kharisma et al.
2019/0114354 A1 * 4/2019 Orun ..................... G06F 16/285
2021/0334295 A1 * 10/2021 Zhu ....................... G06F 16/214
2022/0374401 A1 11/2022 Oberhofer et al.
2024/0257951 A1 * 8/2024 Freese ..................... G06F 16/23

* cited by examiner

*Primary Examiner* — Son T Hoang
(74) *Attorney, Agent, or Firm* — Lily Neff, Esq.; Blanche E. Schiller, Esq.; Heslin Rothenberg Farley & Mesiti P.C.

(57) ABSTRACT

At least one data structure constructed based on data obtained from one or more sources is accessed. The at least one data structure includes a plurality of columns of data. Based on the plurality of columns of data, one or more indexing attributes is automatically generated. The automatically generating includes generating one or more sub-columns from the plurality of columns of data, in which a sub-column is a portion of a selected column of the plurality of columns of data. At least one indexing column is selected, from the plurality of columns of data and the one or more sub-columns, as at least one an indexing attribute. An indication of the at least one indexing attribute is provided. The at least one indexing attribute is to be created as at least one index used in entity resolution to be executed by one or more computing devices.

20 Claims, 9 Drawing Sheets

400

422 424 426 428

420, 410

| NAME | EMAIL | PHONE | ID |
|---|---|---|---|
| NAME1 | abc@gmail.com | 124-112234 | A123456 |
| NAME2 | efg@yahoo.com | 124-113344 | B567897 |
| NAME3 | xyz@gmail.com | 124-889900 | A124151 |
| NAME4 | lmn@gmail.com | 120-540548 | A171681 |

FIG. 4A 422 424a 424b 426a 426b 428

| NAME | EMAIL_P1 | EMAIL_P2 | PHONE_P1 | PHONE_P2 | ID |
|---|---|---|---|---|---|
| NAME1 | abc | gmail.com | 124 | 112234 | A123456 |
| NAME2 | efg | yahoo.com | 124 | 113344 | B567897 |
| NAME3 | xyz | gmail.com | 124 | 889900 | A124151 |
| NAME4 | lmn | gmail.com | 120 | 540548 | A171681 |

FIG. 4B

| | COLUMN | COMPLETENESS | DISTRIBUTION | SELECTED |
|---|---|---|---|---|
| 450 | ID | 90% | ACCEPTABLE | YES |
| 452 | NAME+EMAIL_P1 | 70% | ACCEPTABLE | YES |
| 454 | NAME+PHONE_P2 | 80% | ACCEPTABLE | YES |
| 456 | EMAIL_P1+PHONE_P2 | 45% | ACCEPTABLE | NO |

FIG. 4C

AUTOMATIC IMPLEMENTATION OF ATTRIBUTES FOR USE IN ENTITY RESOLUTION

BACKGROUND

One or more aspects relate, in general, to facilitating processing within a computing environment, and in particular, to facilitating processing in computing environments that perform entity resolution processing.

Entity resolution includes identifying and linking records from different sources that refer to the same entity (e.g., person, customer, user, product, enterprise, other entities). It uses various techniques, such as matching, fuzzy matching, data cleansing and probabilistic matching to handle variations in data, to create a unified view of the entity. Entity resolution is used in master data management employed to manage and control data of an enterprise, such as an organization, business, company or other enterprises.

A master data management system maintains a consistent, centralized repository of information across an enterprise. It executes processes, such as an entity resolution process, that uses match processing to identify and link records from different datasets that refer to the same real-world entity (e.g., person, customer, user, product, enterprise, etc.). By identifying and linking the records, a unified view (e.g., a golden record) for an entity is created.

Typically, in a master data management solution implemented within a computing environment, to find a duplicate match in a given data population, approximately $n^2$ comparisons are performed. However, with the use of comparison techniques, such as bucketing and indexing, the number of comparisons may be limited to a chosen set of candidates.

SUMMARY

Shortcomings of the prior art are overcome, and additional advantages are provided through the provision of a method. The method includes accessing, using a computing device, at least one data structure constructed based on data obtained from one or more sources. The at least one data structure includes a plurality of columns of data. Based on the plurality of columns of data, automatically generating, using the computing device, one or more indexing attributes. The automatically generating includes generating one or more sub-columns from the plurality of columns of data. A sub-column of the one or more sub-columns is a portion of a selected column of the plurality of columns of data. At least one indexing column is selected from the plurality of columns of data and the one or more sub-columns as at least one indexing attribute of the one or more indexing attributes. An indication of the at least one indexing attribute is provided. The at least one indexing attribute is to be created as at least one index used in entity resolution to be executed by one or more computing devices.

Computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4A depicts one example of a data structure that includes a plurality of columns and a plurality of records, in accordance with one or more aspects of the present disclosure;

FIG. 4B depicts one example of the data structure of FIG. 4A in which selected columns are split into multiple sub-columns, in accordance with one or more aspects of the present disclosure;

FIG. 4C depicts one example of indexing evaluation results for columns, sub-columns and column combinations, in accordance with one or more aspects of the present disclosure;

DETAILED DESCRIPTION

Figure 1:
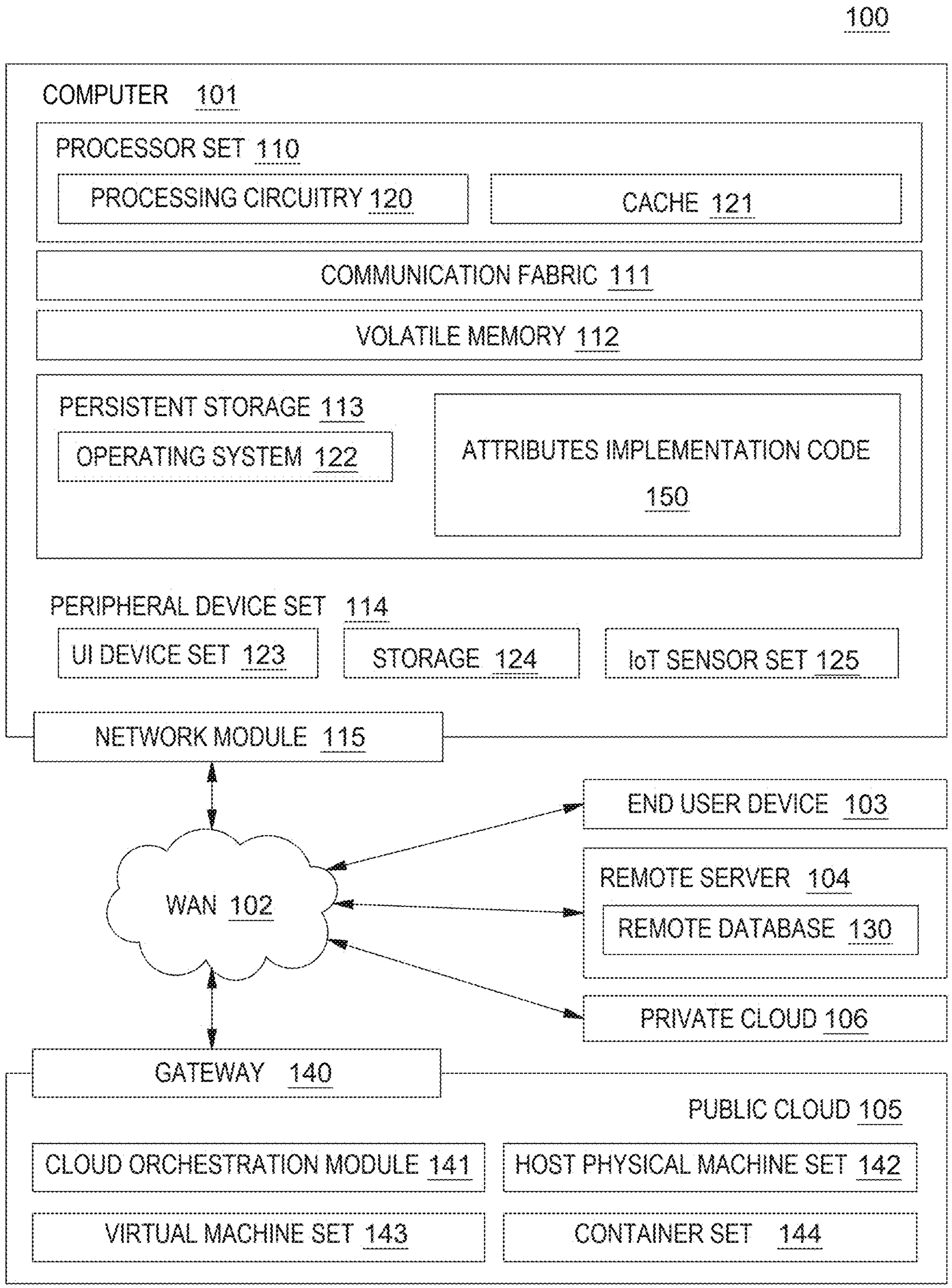
FIG. 1 depicts one example of a computing environment to incorporate, perform and/or use one or more aspects of the present disclosure.

In accordance with one or more aspects of the present disclosure, a capability is provided to facilitate processing within a computing environment. In one or more aspects, the capability includes facilitating processing within computing environments that employ entity resolution and/or master data management. In one or more examples, indexing and/or matching processing used in entity resolution is improved, thereby improving processing within a computing device and reducing storage requirements, as examples.

Master data management is used to create a single record for an entity, such as a user, person, customer, product, enterprise, etc., that is a single source of truth for that entity. To create the record, master data management uses entity resolution, matching, and/or other techniques, such as linking, to automatically and dynamically create the single record.

Typically, in a master data management solution, to find a duplicate match in a given data population, approximately $n^2$ comparisons are performed. However, with the use of comparison techniques, such as bucketing and indexing, the number of comparisons may be limited to a chosen set of candidates. Bucketing organizes the data into smaller units or buckets. It uses, for instance, a hash function on one or more indexing attributes (e.g., fields, columns) of the data to place the data into the buckets. An indexing attribute is, e.g., a specific field or column within the data that is chosen to be indexed. It is used to create an index providing faster retrieval and/or matching of data when querying based on those attributes. An indexing attribute is used to create an index for optimized data access.

For quality matches and performance in bucketing or other matching techniques, the right set of fields for bucket indexes are to be chosen. A bucketing strategy that can miss a match is defective, but one that has too wide of a net leads to poor performance. Understanding statistical distribution of attributes and domain knowledge are used to choose the right kind of attributes (e.g., indexing attributes) as bucket roles. Experimenting with many combinations takes a lot of time and effort. Currently, these experiments are performed based on a user's domain expertise.

However, in accordance with one or more aspects, a capability is provided that facilitates the generation (e.g., creation, construction, building, selection, production, etc.) of indexing attributes to be used in entity resolution processing. The capability automatically generates indexes to be used, as described in one or more aspects herein. In one or more aspects, patterns are identified, as well as columns, sub-columns and/or combination columns to be used in indexing (referred to herein as indexing columns) prior to runtime. The generation of indexing columns (e.g., columns, sub-columns and/or combination columns) to be used as indexing attributes prior to runtime significantly reduces the time and cost associated with a master data management implementation and improves processing within a computing environment. As an example, processing time is improved since the number of records to compare is reduced. As a further example, storage requirements are reduced by avoiding the storing of duplicate data. Other examples are possible.

In one or more aspects, the generation of indexing attributes is part of an attributes implementation process used in entity resolution. Another part of the attributes implementation process includes generation of matching attributes, which are also used in entity resolution. As an example, indexing attributes (also referred to as bucketing attributes) are used to select a bucket of candidate records likely to match an incoming record without requiring a comparison of the incoming record to all other records; and matching attributes are used to compare the incoming record to the candidate records in the bucket to identify a matched record. Matching attributes may include one or more indexing attributes.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs attributes implementation processing and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as attributes implementation code 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106, 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. For instance, in one or more embodiments, one or more of the components/modules/blocks of FIG. 1 are not included in the computing environment and/or are not used for one or more aspects of the present disclosure. Further, in one or more embodiments, additional and/or other components/modules/blocks may be used. Other variations are possible.

Figure 2:
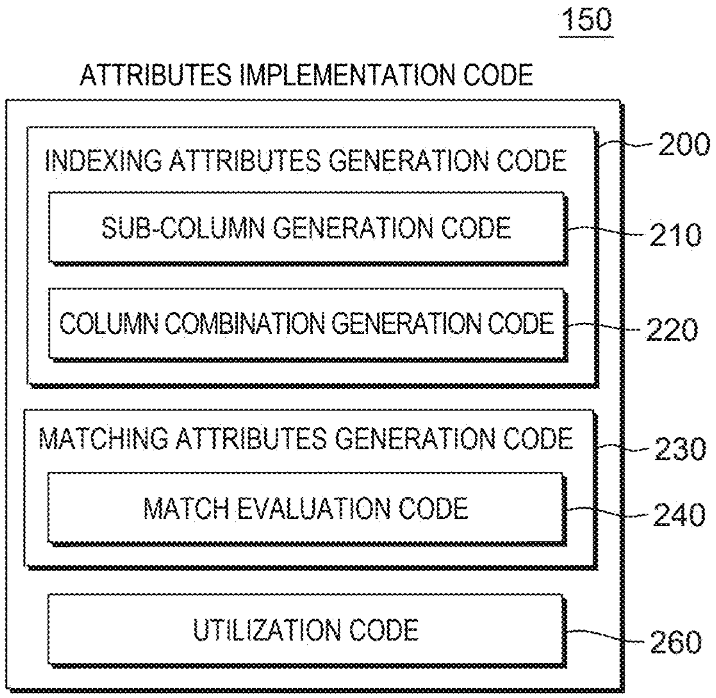
FIG. 2 depicts one example of the attributes implementation code of FIG. 1, in accordance with one or more aspects of the present disclosure.

Further details relating to attributes implementation code are described with reference to FIG. 2. In one example, attributes implementation code (e.g., attributes implementation code 150) includes various code to be used in the implementation (e.g., generation, build, construction, creation, selection, production, utilization, etc.) of indexing attributes and/or matching attributes, and/or to perform tasks relating thereto. The code is, e.g., computer-readable program code (e.g., instructions) in computer-readable media, e.g., storage (persistent storage 113, cache 121, storage 124, other storage, as examples). Although, as an example, indexing attributes implementation code 150 is depicted in FIG. 1 in persistent storage 113, the code and/or one or more portions of the code may be in other storage, such as storage 124, etc. Many variations are possible.

The computer-readable media may be part of one or more computer program products and the computer-readable program code may be executed by and/or using one or more computing devices (e.g., one or more computers, such as computer(s) 101; one or more servers, such as remote server(s) 104; one or more end user devices, such as end user device(s) 103; one or more processors or nodes, such as processor(s) or node(s) of processor set 110; processing circuitry, such as processing circuitry 120 of processor set 110; and/or other devices, etc.). Additional and/or other computers, servers, end user devices, processors, nodes, processing circuitry, and/or other devices may be used to execute the code and/or portions thereof. Many examples are possible.

In one example, attributes implementation code 150 includes, for instance, indexing attributes generation code 200 to be used to generate (e.g., build, construct, create, produce, select, etc.) one or more indexing attributes to be used to create indexes; matching attributes generation code 230 to be used to generate (e.g., build, construct, create, produce, select, etc.) one or more matching attributes; and utilization code 260 to be used to employ one or more of the indexing attributes and/or the matching attributes to update/create a record in storage (e.g., a central repository, other storage location, etc.). As an example, indexing attributes generation code 200 includes, for instance, sub-column generation code 210 to be used to generate (e.g., automatically) sub-columns from, e.g., column data; and column combination generation code 220 to be used to generate column combinations from, e.g., the column and/or sub-column data. Further, matching attributes generation code 230 includes, for instance, match evaluation code 240 to be used to generate matching attributes based on evaluating the columns, the generated sub-columns and/or the generated column combinations. Additional, less and/or other code may be used to implement attributes (e.g., indexing and/or matching attributes). Other variations are possible. Although various code is described, attributes implementation code, such as attributes implementation code 150, may include additional, less and/or different code. Particular code may include additional code, less code, and/or different code. Further, additional, less and/or other code may be used in the implementation of indexing and/or matching attributes and/or to perform related tasks. Many variations are possible.

Figure 3:
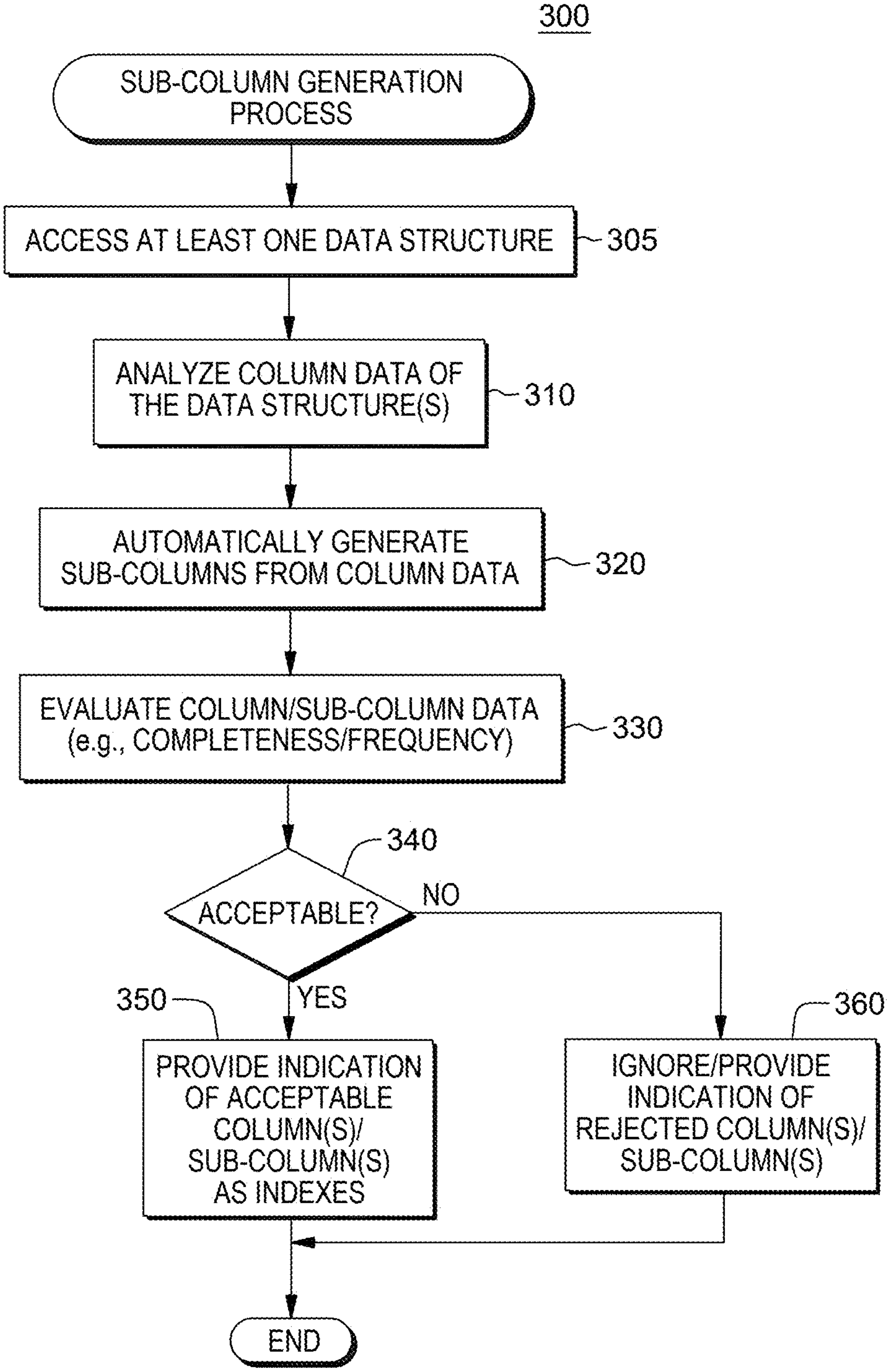
FIG. 3 depicts one example of a sub-column generation process, in accordance with one or more aspects of the present disclosure.
Figure 5:
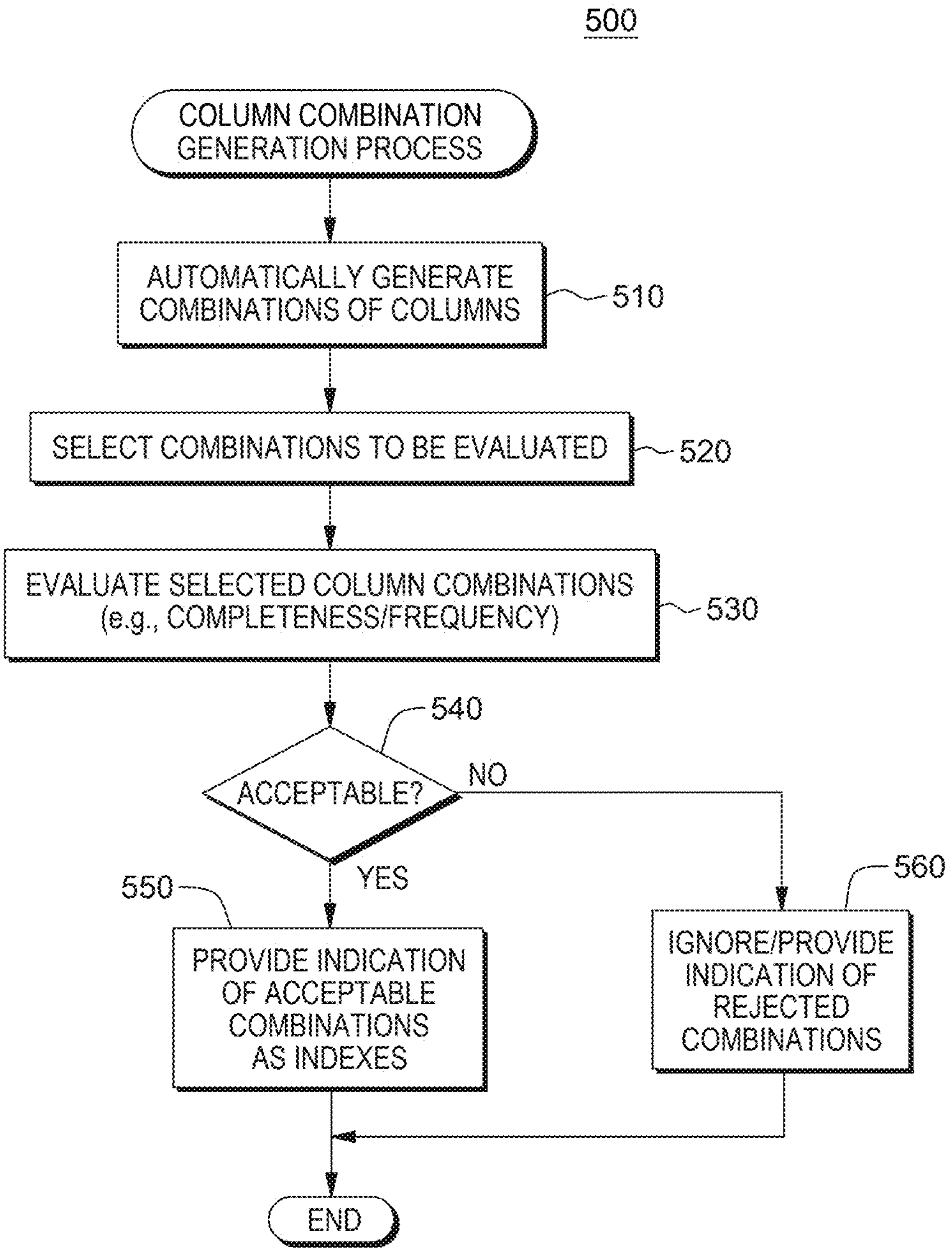
FIG. 5 depicts one example of a column combination generation process, in accordance with one or more aspects of the present disclosure.
Figure 6:
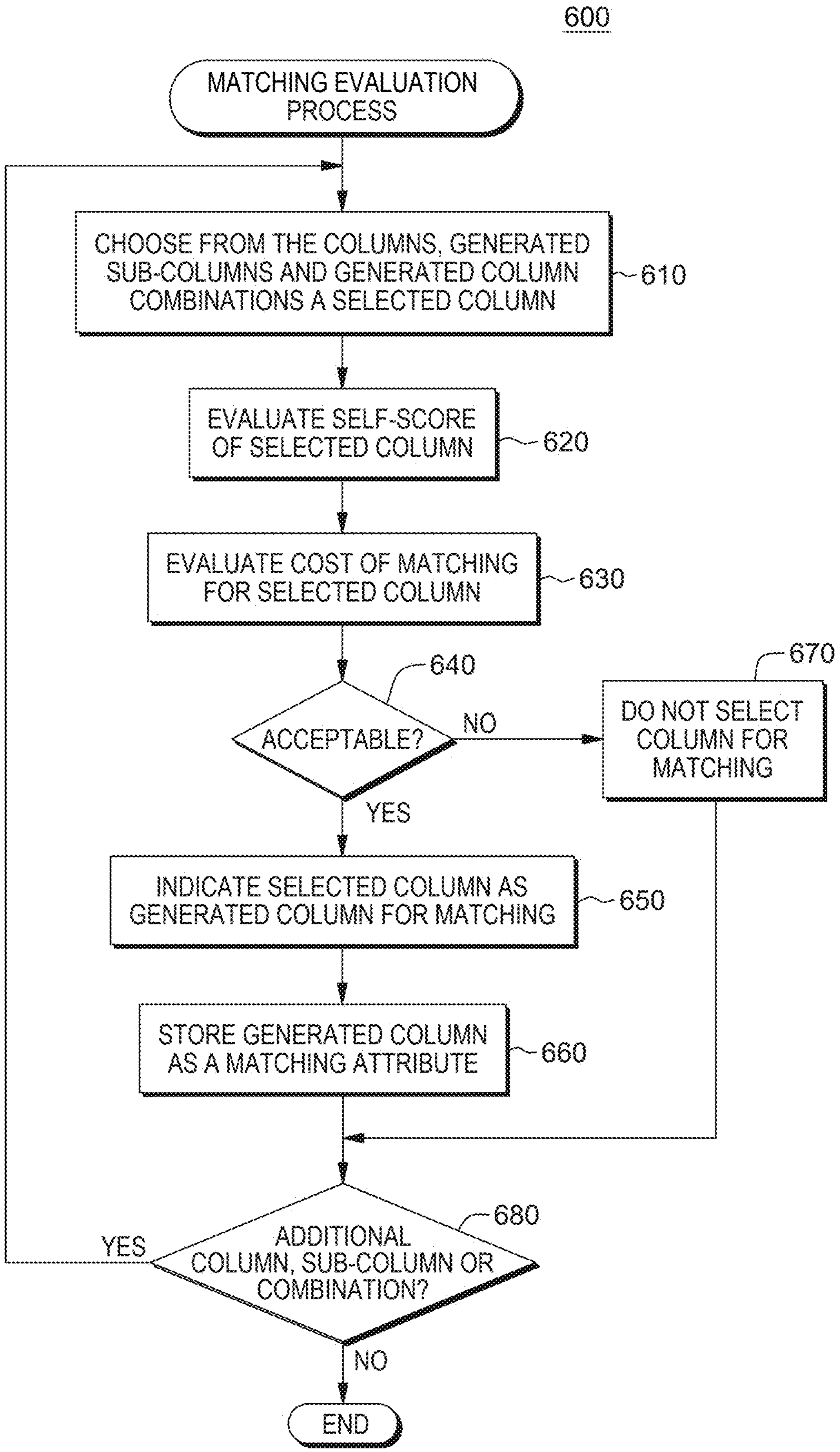
FIG. 6 depicts one example of a matching evaluation process, in accordance with one or more aspects of the present disclosure.
Figure 7:
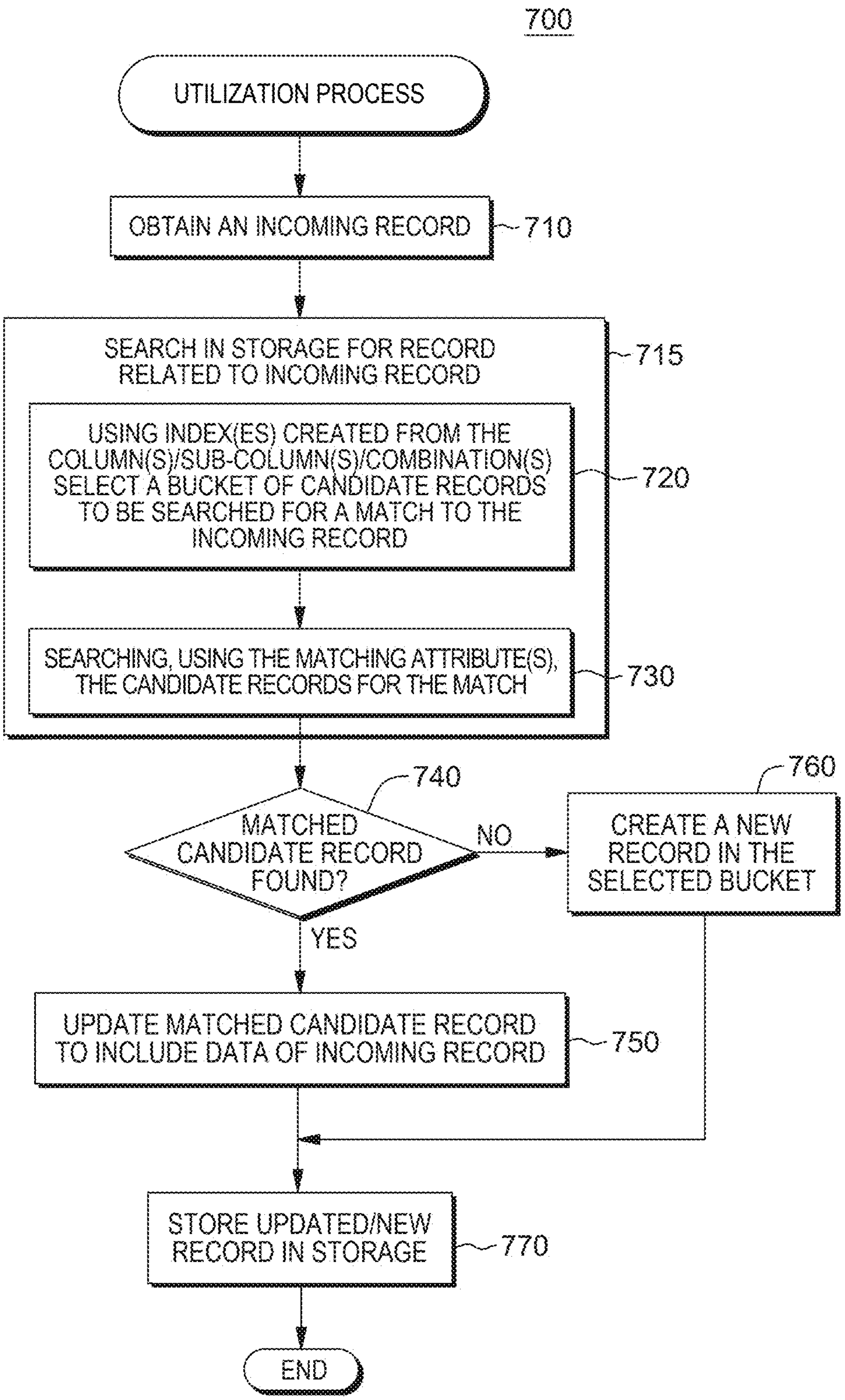
FIG. 7 depicts one example of a utilization process, in accordance with one or more aspects of the present disclosure.

In one example, the attributes implementation code (e.g., attributes implementation code 150) is used, in accordance with one or more aspects of the present disclosure, in the implementation of indexing attributes to be used to create indexes, matching attributes to be used in a matching-type process and/or to perform other tasks related thereto, as further described with reference to the processes depicted in FIGS. 3 and 5-7. For instance, FIG. 3 depicts one example of a sub-column generation process implemented using one or more portions of attributes implementation code 150 (e.g., code 200-210), in accordance with one or more aspects of the present disclosure; FIG. 5 depicts one example of a column combination generation process implemented using one or more portions of attributes implementation code 150 (e.g., code 200, 220), in accordance with one or more aspects of the present disclosure; FIG. 6 depicts one example of a matching evaluation process implemented using one or more portions of attributes implementation code 150 (e.g., code 230-240), in accordance with one or more aspects of the present disclosure; and FIG. 7 depicts one example of a utilization process implemented using one or more portions of attributes implementation code 150 (e.g., code 260), in accordance with one or more aspects of the present disclosure.

In one example, each process is executed by a computing device (e.g., a computer (e.g., computer 101, other computer, etc.), a server (e.g., server 104, other server, etc.), an end user device (e.g., end user device 103, other end user device, etc.), a processor, node and/or processing circuitry, etc. (e.g., of processor set 110 or other processor sets) and/or one or more other computing devices, etc.). Although example computers, servers, end user devices, processors, nodes, processing circuitry and/or computing devices are provided, additional, fewer and/or other computers, servers, end user devices, processors, nodes, processing circuitry and/or computing devices may be used for a process and/or other processing. Various options are possible.

Further details relating to each of the processes are described below. Initially, referring to FIG. 3, in one example, a sub-column generation process 300 (also referred to herein as process 300) accesses 305 at least one data structure (e.g., table) having a plurality of records relating to a plurality of entities (e.g., customers, users, persons, products, enterprises, etc.) of an enterprise (e.g., organization, company, business, etc.). The at least one data structure is stored in storage, such as a database in storage. Storage, as used herein, includes any type of storage location, including, but not limited to, memory, caches, repositories, storage devices, etc. In one example, the at least one data structure is stored in a central repository (e.g., of an enterprise); other examples are possible.

In one example, process 300 accesses (e.g., obtains (e.g., receives, is provided, extracts, retrieves, is given, is transmitted, etc.) and reads) the at least one data structure using at least one network.

Based on accessing the data structure, process 300 analyzes 310 column data of the at least one data structure to determine whether sub-columns are to be generated from the column data. This is further described with reference to FIG. 4A. In one example, a data structure 400 has a plurality of records 410, and each record has a plurality of attributes 420. For example, the plurality of attributes includes name (e.g., NAME 422), email address (e.g., EMAIL 424), phone number (e.g., PHONE 426) and identifier (e.g., ID 428). Additional, less and/or other attributes may be provided for a record. Further, although for convenience, four records are depicted in FIG. 4A, in other examples, there may be fewer or more (even many more) records. Many examples are possible.

The plurality of attributes is arranged, in this example, in columns. The data in the columns are analyzed to determine whether sub-columns of the columns are to be generated. For example, sub-columns may be generated for columns that have a lot of repeated text (e.g., emails (e.g., EMAIL 424), phone numbers (e.g., PHONE 426), uniform resource locator (URL) of social media links, etc.). Many examples of columns with repeated text may be provided. Those mentioned herein are just examples.

Columns with repeated text may create too many candidates during indexing, especially when n-gram techniques are used. An n-gram technique breaks text into a sequence of n characters or words to be used to create searchable indexes. Further, during the matching phase, such attributes may cause too many false positives, given a small edit distance between them. Thus, in accordance with one or more aspects, the repeatable text is to be avoided during indexing and/or matching.

In one example, referring to FIG. 3, process 300 analyzes 310 the column data and looks for selected delimiters, such as a space, slash, hyphen, symbol (e.g., @), etc. Based on finding a selected delimiter, process 300 automatic generates 320 sub-columns by splitting the column data at the selected delimiter. For example, referring to FIG. 4A, the column having attribute EMAIL 424 is split into two sub-columns. As an example, as depicted in FIG. 4B, attribute EMAIL 424 is split into email part 1 (e.g., EMAIL_P1 424*a*) and email part 2 (e.g., EMAIL_P2 424*b*). Similarly, the column having attribute PHONE 426 is split into two sub-columns: phone part 1 (e.g., PHONE_P1 426*a*) and phone part 2 (e.g., PHONE_P2 426*b*). Other examples are possible.

In one example, machine learning may be used to determine which columns/sub-columns are to be selected for the generation of sub-columns. For instance, a machine learning model may be trained to select columns to be split into sub-columns. The training is based on, for instance, the amount and/or type of data in a column. For example, the training is based on, for instance, the degree of repeatability of the data in the columns, expected number of false positives, edit distance, etc. Based on providing acceptable levels of false positives, edit distance, repeatability, etc., the machine learning model is trained and used to select columns for splitting. Further, the machine learning model is retrained based on learning produced from using the selected columns/sub-columns as indexes. Other examples are possible.

In one or more aspects, the number of columns/sub-columns to be generated may become too many (e.g., over a selected threshold, etc.). In such a case, predefined rules may be created and used to indicate preferences in the types of columns to be split into sub-columns. This information may also be fed into the machine learning model and used to train/retrain the model for optimal selection of columns for splitting.

Returning to FIG. 3, based on automatically generating the sub-columns, process 300 evaluates 330 the column/sub-column data. For instance, process 300 checks each column/sub-column for completeness and compares the amount of completeness for each column/sub-column to a predefined threshold (e.g., 50%, 75%, 100%, or any selected predefined threshold). As examples, there may be one threshold for all the columns/sub-columns, a threshold for each column/sub-column or a threshold for selected columns/sub-columns. Many examples are possible. As a further example, process 300 checks the frequency distribution for each of the columns/sub-columns. For instance, it checks how often the data occurs and the pattern of occurrence. In one example, the frequency distribution is compared to an expected frequency distribution and a determination is based thereon. Other examples are possible.

Process 300 determines 340 whether the evaluation is acceptable. The column(s)/sub-column(s) that have a predefined relationship between a completeness indication and a threshold (e.g., completeness indication above the threshold(s) or another predefined relationship) and a frequency distribution close to acceptable/typical signature (as predefined) are chosen for indexing. In one example, process 300 provides 350 an indication of acceptable column(s)/sub-column(s) to be created as indexes. As an example, to create an index from an indexing attribute, a process (e.g., generate derived data) is executed that converts the content of the indexing attribute column into hashes. The hashes are stored in, e.g., a database and there is a database level index on the column containing these hashes. This index facilitates quick retrieval of records with given hashes. In one example, the providing the indication includes storing, at least, an indication of the acceptable column(s)/sub-column(s) as an indexing attribute or index. Further, in one example, process 300 ignores or provides an indication 360 of those column(s)/sub-column(s) with low cardinality that are rejected and are not, in this example, to be created as indexes. Other examples are possible.

In the example in FIG. 4B, it is assumed that the column having the attribute ID (e.g., ID 428) meets the evaluation criteria, and thus, is selected for indexing, but that columns having attributes email part 2 (e.g., EMAIL_P2 424*b*) and phone part 1 (e.g., PHONE_P1 426*a*) are not selected for indexing due to low cardinality.

Based on the sub-column creation process and the evaluation, one or more columns were not selected or rejected. For example, with reference to FIGS. 4A-4B, the columns having the following attributes have not been selected or rejected: name (e.g., NAME 422), email part 1 (e.g., EMAIL_P1 424*a*) and phone part 2 (e.g., PHONE_P2 426*b*). As an example, in terms of thresholds, the uniqueness or completeness thresholds may not be a single value, but rather there may be, e.g., two values: high threshold and low threshold (or acceptable threshold and rejection threshold). When the uniqueness/completeness criteria for a column/sub-column falls in between these two thresholds, it is neither a selection nor a rejection, and thus, may be further processed. Similarly, in terms of signatures of frequency distribution, there may be acceptable signature patterns and unacceptable signatures patterns. When the distribution signature pattern does not match either, the column is neither a selection nor a rejection, and thus, may be further processed. Other examples are possible.

In accordance with one or more aspects, the columns not selected or rejected are evaluated for combining to produce one or more combinations of columns. One example of this processing is described with reference to FIG. 5. In one example, a column combination generation process 500 (also referred to herein as process 500) automatically generates 510 combinations of columns from the unselected/unrejected columns (also referred to herein as the remaining columns). As examples, the following combinations are automatically generated: NAME+EMAIL_P1, NAME+PHONE_P2, and EMAIL_P1+PHONE_P2. Other examples are possible, including combinations of more than two columns and/or combinations of columns/sub-columns that are rejected and/or accepted. Again, many examples are possible.

In one example, machine learning may be used to determine which columns/sub-columns are to be combined. For instance, a machine learning model may be trained to generate combinations to be created as indexes. The training is based on, for instance, the data and/or type of data in the columns/sub-columns, etc. Further, the machine learning model is retrained based on learning produced from using the combinations as indexes. Other examples are possible.

In one or more aspects, the number of columns/sub-columns to be generated may become too many (e.g., over a selected threshold, etc.). In such a case, predefined rules may be created and used to indicate preferences in the combinations of certain types of columns to be generated. This information may also be fed into the machine learning model and used to train/retrain the model for optimal selection of combinations for indexing.

In one or more aspects, process 500 selects 520 combinations to be evaluated from the generated combinations. For instance, process 500 may have an overall cap on the total number of combinations to be evaluated, and based on this cap, selects combinations from the generated combinations. This may be all of the generated combinations, especially if the number of generated combinations does not exceed the cap (e.g., the number of generated combinations was controlled based on the predefined rules, etc.); or may be a portion of the generated combinations. If a portion of the generated combinations is to be selected for evaluation, process 500, in one example, selects the portion of generated combinations based on a selection criterion (e.g., a set of one or more predefined rules; the first x generated combinations (where x does not exceed the cap); a random selection; etc.). As another example, it may use machine learning (e.g., a trained machine learning model) to select the combinations. For instance, the machine learning model may be trained/retrained based on which combinations improve performance the greatest amount, facilitate storage, etc. Other examples are possible.

Process 500 evaluates 530 the selected column combinations (e.g., column/column combination; column/sub-column combination; etc.). For instance, process 500 checks each combination for completeness and compares the amount of completeness for each combination to a predefined threshold (e.g., 50%, 75%, 100%, or any selected predefined threshold). As examples, there may be one threshold for all the combinations, a threshold for each combination or a threshold for selected combinations. Many examples are possible. As a further example, process 500 checks the frequency distribution for each of the combinations. For instance, it checks how often the data occurs and the pattern of occurrence. In one example, the frequency distribution is compared to an expected frequency distribution and a determination is based thereon. Other examples are possible.

Process 500 determines 540 whether the evaluation is acceptable. The combination(s) that have a predefined relationship between a completeness indication and a threshold (e.g., completeness indication above the threshold(s) or another predefined relationship) and a frequency distribution close to acceptable/typical signature (as predefined) are chosen for indexing. In one example, process 500 provides 550 an indication of acceptable combination(s) to be created as indexes. In one example, this includes storing, at least, an indication of the combination as an indexing attribute or index (which is created as indicated herein, in one example). Further, in one example, process 500 ignores or provides an indication 560 of those combination(s) with low cardinality that are rejected and are not, in this example, to be created as indexes. Other examples are possible.

In the example described herein, it is assumed that combinations NAME+EMAIL_P1 and NAME+PHONE_P2 are acceptable, and EMAIL_P1+PHONE_P2 is unacceptable (i.e., rejected.) Thus, as depicted in FIG. 4C, combinations NAME+EMAIL_P1 452 and NAME+PHONE_P2 454 are selected for indexing, along with the id column (e.g., ID 450). As shown, in one example, based on evaluation, the column ID (e.g., ID 450) had a completeness level of 90% (over the predefined threshold of, e.g., 60% or another selected threshold) and an acceptable distribution (based on a predefined criterion), and therefore, was selected for indexing. Similarly, in this example, the column NAME+EMAIL_P1 (e.g., NAME+EMAIL_P1 452) had a completeness level of 70% (over the predefined threshold of, e.g., 60% or another selected threshold) and an acceptable distribution, and therefore, was selected for indexing; and column NAME+PHONE_P2 (e.g., NAME+PHONE_P2 454) had a completeness level of 80% (over the predefined threshold of, e.g., 60% or another selected threshold) and an acceptable distribution, and therefore, was selected for indexing. However, in this example, the column EMAIL_P1+PHONE_P2 (e.g., EMAIL_P1+PHONE_P2 456) had a completeness level of 45% (under the predefined threshold of, e.g., 60% or an other selected threshold), and therefore, was not selected for indexing, even though it had an acceptable distribution. Many other examples are possible.

In one or more aspects, in addition to selecting the indexing columns (e.g., columns, sub-columns, combinations) for indexing, an evaluation is performed to determine which columns, sub-columns, combinations are to be used for matching.

During a matching phase, typically, the whole attribute value is used. However, in accordance with one or more aspects, instead of using an entire attribute, in one or more instances, a portion of the attribute, referred to as a sub-column, is used to provide better similarity scores. A similarity score in matching is a numerical value that indicates the degree of closeness or resemblance between two data items being compared. For instance, the two data items are compared, and the comparison yields a similarity score between, e.g., 0 and 1. That score is then compared to a threshold (e.g., predefined, automatically determined, etc.) and if the score has a certain relationship with the threshold (e.g., equal to or above, above, etc.), the data items are considered a match.

The selecting of the sub-columns, columns and/or combination columns to be used for matching is described with reference to FIG. 6. In one example, a matching evaluation process 600 (also referred to herein as process 600) chooses 610 from the columns, generated sub-columns and generated column combinations, a selected column to be evaluated as a matching attribute. The column, sub-column or column combination may be one selected for indexing and/or it may be one not selected for indexing.

Process 600 evaluates 620 a self-score of the selected column. A self-score is an indication of how well the content of the column resembles itself (often used as a baseline).

Further, in one example, process 600 evaluates 630 the cost of matching for the selected column. For instance, the cost of matching is based on the cost of an associated matching function (e.g., edit distance, other matching functions, etc.). Process 600 determines 640 whether the evaluation is acceptable. For instance, if the average string size in a sub-column is too large, the edit distance would be too costly, and therefore, the evaluation is unacceptable, and the column/sub-column/combination is not selected for matching. Other examples are possible.

In one example, process 600 provides 650 an indication that the selected column is a generated column for matching (referred to herein as a matching column or a matching attribute). In one example, process 600 optionally stores 660 the generated column as a matching attribute. For example, it stores, at least, an indication of the matching column as a matching attribute. Further, returning to inquiry 640, in one example, based on the evaluation being unacceptable, process 600 does not select 670 the selected column for matching. Other examples are possible.

Thereafter, or based on indicating the selected column as a generated column for matching (and/or storing the generated column as a matching attribute), process 600 determines 680 whether there are additional columns, sub-columns and/or combination columns to be evaluated as a matching attribute. If so, processing continues with choosing 610 a column, sub-column or combination column for evaluating. Otherwise, processing is complete.

The one or more generated attributes for matching, as well as the one or more indexing attributes, are then used in a matching process to update or create a record. For instance, as described with reference to FIG. 7, in one example, a utilization process 700 (also referred to as process 700) includes obtaining 710 (e.g., receiving, being provided, extracting, being transmitted, retrieving, accessing, etc.) an incoming record to be used to update a record in storage or create a record in storage. The incoming record is, for instance, an electronic record with digital data. In one example, the incoming record has data for an entity, such as a customer, user, person, product, enterprise, etc.

Based on the incoming record, process 700 performs 715 a search in, e.g., a database or other structure in storage for a record in storage related to the incoming record. The search uses the one or more indexing attributes (or indexes) and the one or more matching attributes. For instance, process 700 uses 720 one or more indexes (or indexing attributes) created from the column(s)/sub-column(s)/column combination(s) to select a bucket of candidate records to be searched for a match to the incoming record. Based on selecting the bucket, process 700 searches 730, using one or more matching attributes, the candidate records in the selected bucket for a match to the incoming record.

Process 700 determines 740 whether a candidate record that matches the incoming record is found. If it is found, then process 700 updates 750 the matched candidate record to include data of the incoming record. This is to produce a golden record that includes in one record the data for a single entity. If, however, a candidate record is not found that matches the incoming record, then, in one example, process 700 creates 760 a new record in the selected bucket. Other examples are possible.

Process 700 stores 770 the updated record or new record in storage (e.g., in a database or other structure in storage). This updated or new record is, e.g., a single record that includes data for a single entity. In one example, it is stored in a central repository and transmitted to a requesting enterprise, based on, e.g., a request and optional validation that the enterprise is allowed access to the record. It is used by, e.g., enterprises to have an entity's data in one location (e.g., one record) to improve processing when accessing the entity's data and to reduce storage requirements by not having an entity's data in scattered storage locations and/or by eliminating or reducing duplicate information. Query and update processing related to the record are improved by being able to access and update one record. Many advantages within the computing device and computing environment are provided.

Figure 8:
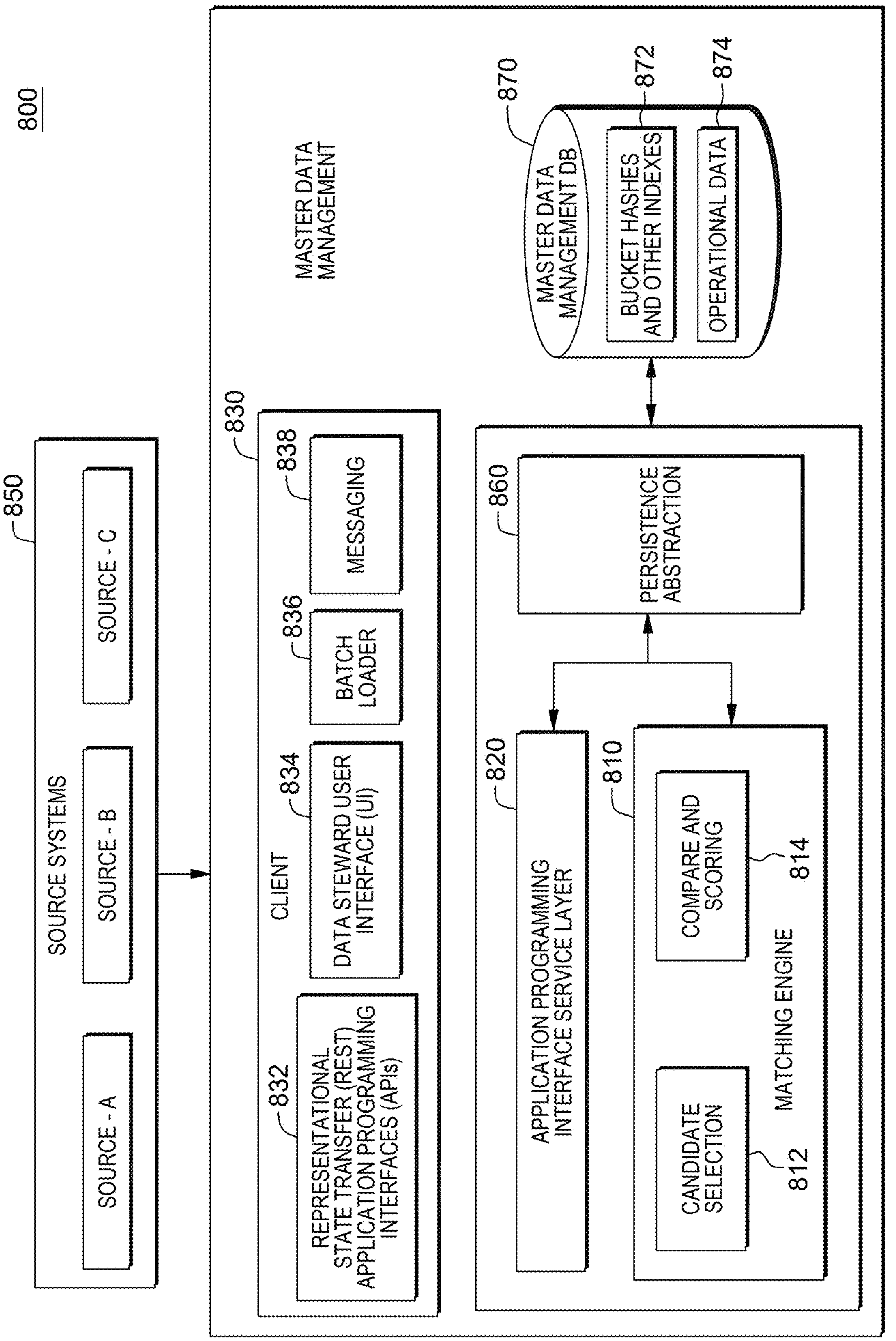
FIG. 8 depicts one example of architectural components of a computing environment to incorporate, perform and/or use one or more aspects of the present disclosure.

In one or more examples, a matching engine is used to, at least, perform matching. One example of a matching engine is depicted in FIG. 8. As shown, in one example, a system architecture 800 includes a matching engine 810 (e.g., at least a portion of a computing device) that includes, in one example, a candidate selection engine 812 and a compare and scoring engine 814. Matching engine 810 is coupled to an application programming interface service layer 820 that receives data from a client 830 (e.g., a master data management client) that includes one or more data transmission protocols, including representational state transfer (REST) application programming interface(s) (APIs) 832, data steward user interface(s) (UIs) 834, batch loader 836 and/or messaging 838). Client 830 transfers (e.g., transmits) data from one or more source systems 850 to matching engine 810 via application programming interface service layer 820.

Application programming interface service layer 820 and matching engine 810 are coupled to a database (e.g., a master data management database (DB) 870) via, e.g., a persistence abstraction engine 860 that performs a number of tasks, including storing operational data 874 received from one or more source system 850 in database 870. In one example, matching engine 810 performs index and/or matching candidate selection (e.g., using candidate selection engine 812 and/or compare and scoring engine 814) based on, e.g., operational data 874 generating one or more attributes to be used for indexing and/or matching. The one or more attributes (and/or indexes created based thereon) may be stored in master data management database 870 in a location referred to as bucket hashes and other indexes 872 and/or in other locations. Many examples are possible.

In one or more aspects, a capability is provided to recommend indexing and matching attributes (e.g., fields, columns, sub-columns, combinations) during, e.g., a master data management solution phase, prior to the master data management runtime being available. In one or more aspects, an automatic generation of sub-columns in the data is performed to help remove parts of the columns that make its use inefficient. In one or more aspects, suitable columns, sub-columns and/or column combinations are determined for indexes. In one or more aspects, suitable columns, combinations of columns and/or sub-columns are provided for a matching phase. This facilitates processing of a master data management solution, which improves processing and/or storage of a computing environment.

One or more aspects of the automatically generating attributes (e.g., indexing attributes and/or matching attributes) may use artificial intelligence including, machine learning. For instance, machine learning and/or other artificial intelligence may be used to automatically and dynamically generate sub-columns from a given set of one or more columns, generate column combinations and/or select from the given set of one or more columns, the generated sub-columns and the generated column combinations one or more selected columns to be used in indexing and/or matching.

Figure 9:
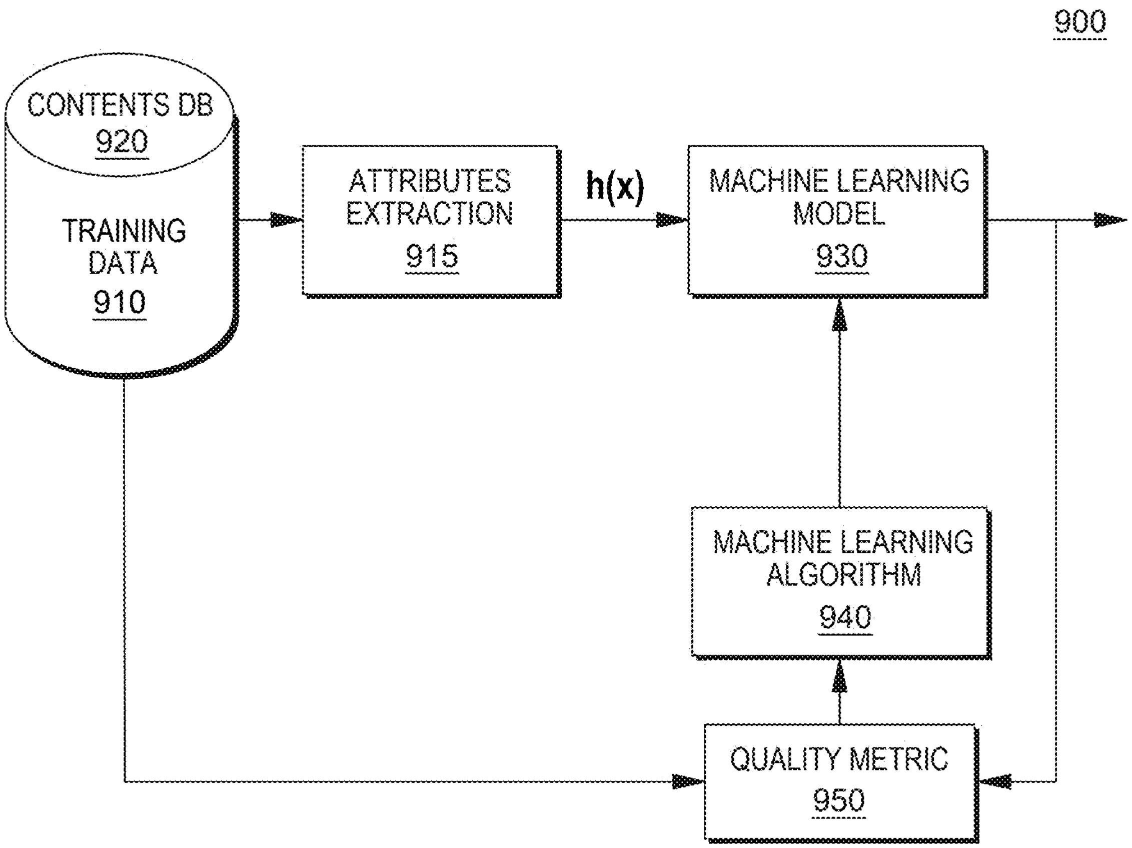
FIG. 9 depicts one example of a machine learning training system used in accordance with one or more aspects of the present disclosure.

One example of a machine learning training system is described with reference to FIG. 9. In one or more aspects, a machine learning training system 900 may be utilized to perform cognitive analyses of various inputs, including input data, data from one or more sources, repositories, data structures and/or other data. The data may include column data, etc. and be related to an entity. Training data utilized to train the model in one or more embodiments of the present disclosure includes, for instance, data that pertains to one or more events, such as natural language processing data, data being processed; data obtained from exogenous sources (e.g., entity record information, etc.); etc. The program code in embodiments of the present disclosure performs a cognitive analysis to generate one or more training data structures, including algorithms utilized by the program code to predict states of a given event (e.g., attributes implementation, etc.). Machine learning (ML) solves problems that are not solved with numerical means alone. In this ML-based example, program code extracts various training attributes from ML training data 910 (e.g., historical attribute data collected from various data sources relevant to the event (e.g., attributes implementation)), which may be resident in one or more databases 920 comprising event and/or general data. Training attributes 915 are utilized to develop a predictor function, h (x), also referred to as a hypothesis, which the program code utilizes as a machine learning model 930.

In identifying various event states, features, attribute similarities, constraints and/or behaviors indicative of states in the ML training data 910, the program code can utilize various techniques to identify attribute data in an embodiment of the present disclosure. Embodiments of the present disclosure utilize varying techniques to select attribute data (data attributes, elements, columns, sub-columns, combinations, patterns, features, constraints, distribution, etc.), including but not limited to, diffusion mapping, principal component analysis, recursive feature elimination (a brute force approach to selecting attribute data), and/or a Random Forest, to select the attribute data related to various events. The program code may utilize a machine learning algorithm 940 to train the machine learning model 930 (e.g., the algorithms utilized by the program code), including providing weights for the conclusions, so that the program code can train the predictor functions that comprise the machine learning model 930. The conclusions may be evaluated by a quality metric 950. By selecting a diverse set of ML training data 910, the program code trains the machine learning model 930 to identify and weight various attribute data (e.g., data attributes, features, patterns, constraints, columns, sub-columns, combinations, distributions, etc.) that correlate to various states of an event.

The model generated by the program code is self-learning as the program code updates the model based on active event feedback, as well as from the feedback received from data related to the event. For example, when the program code determines that there is a constraint, event, similarity or pattern (e.g., data attribute, record attribute similarity, query pattern, data distribution, search terms distribution, etc.) that was not previously predicted by the model, the program code utilizes a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent (now known or later developed) to tune the model, based on data obtained from one or more data sources. In one or more embodiments, the program code interfaces with application programming interfaces to perform a cognitive analysis of obtained data. Specifically, in one or more embodiments, certain application programming interfaces comprise a cognitive agent (e.g., learning agent) that includes one or more programs, including, but not limited to, natural language classifiers, a retrieve and rank service that can surface the most relevant information from a collection of documents, concepts/visual insights, trade off analytics, document conversion, and/or relationship extraction. In an embodiment, one or more programs analyze the data obtained by the program code across various sources utilizing one or more of a natural language classifier, retrieve and rank application programming interfaces, and trade off analytics application programming interfaces. An application programming interface can also provide audio related application programming interface services, in the event that the collected data includes audio, which can be utilized by the program code, including but not limited to natural language processing, text to speech capabilities, and/or translation.

In one or more embodiments, the program code utilizes a neural network to analyze event-related data to generate the model utilized to predict the state of a given event at a given time. Neural networks are biologically-inspired programming paradigms, which enable a computer to learn and solve artificial intelligence problems. This learning is referred to as deep learning, which is a subset of machine learning, an aspect of artificial intelligence, and includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (or similarities) in data (i.e., neural networks are non-linear statistical data modeling or decision-making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

One or more aspects of the present disclosure are tied to computer technology and facilitate processing within a computer, improving performance thereof. For instance, processing within a computing device is improved, as well as storage. Processing within a processor, computer system and/or computing environment is improved by increasing processing speed used to query or update an entity record and decreasing the amount of storage used to store a record. Other examples are possible.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer-readable code into a computing system, in which the code in combination with the computing system is capable of performing one or more embodiments.

Yet as a further aspect, a process for integrating computing infrastructure comprising integrating computer-readable code into a computer system may be provided. The computer system comprises a computer-readable medium, in which the computer-readable medium comprises one or more embodiments. The code in combination with the computer system is capable of performing one or more embodiments.

Although various embodiments are described above, these are only examples. For example, other techniques may be used to generate indexes and/or matching attributes. Further, other code may be used. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:

executing on a computing device of a computing environment a process to automatically generate indexes used in entity resolution, the executing the process including:

accessing, using the computing device and at least one network of the computing environment, at least one data structure constructed based on data obtained from one or more sources, the at least one data structure stored in storage of the computing environment and including a plurality of columns of data;

automatically generating, using the computing device and based on the plurality of columns of data, one or more indexing attributes, the automatically generating the one or more indexing attributes comprising:

generating multiple sub-columns from the plurality of columns of data, wherein a sub-column of the multiple sub-columns is a portion of a selected column of data of the plurality of columns of data, and wherein the generating the sub-column from the selected column of data includes separating the selected column of data into a re type sub-column in which the data of the selected column is of a repeatable type and another type of sub-column including other data of the selected column of data; and selecting from the plurality of columns of data and the multiple sub-columns at least one indexing column as at least one indexing attribute of the one or more indexing attributes, the at least one indexing attribute used to generate at least one index configured to reduce a number of records compared and storage requirements by avoiding storing duplicate data within the computing environment; and executing the entity resolution by one or more computing devices of the computing environment using the at least one index generated from the at least one indexing attribute.

2. The method of claim 1, wherein the generating the multiple sub-columns comprises:

automatically searching the plurality of columns of data for a column that includes a selected delimiter, the column being the selected column of data; and automatically splitting the column at the selected delimiter creating the multiple sub-columns, wherein one sub-column includes column data prior to the selected delimiter and another sub-column includes other column data subsequent to the selected delimiter.

3. The method of claim 1, wherein the automatically generating further comprises:

generating one or more column combinations based on the one or more sub-columns of the multiple sub-columns and the plurality of columns of data; and wherein the selecting includes selecting the at least one indexing column from the plurality of columns of data, the one or more sub-columns and the one or more column combinations.

4. The method of claim 3, wherein the generating a column combination of the one or more column combinations comprises:

using selected criteria to select multiple columns to be combined, wherein the multiple columns selected to be combined are chosen from a group of columns consisting of the plurality of columns of data and the multiple sub-columns; and combining the multiple columns selected to be combined.

5. The method of claim 1, further comprising automatically generating one or more matching attributes to be used in the entity resolution.

6. The method of claim 5, wherein the automatically generating the one or more matching attributes includes selecting the one or more matching attributes from the plurality of columns of data, the multiple sub-columns and one or more generated column combinations.

7. The method of claim 5, wherein the one or more matching attributes includes at least one sub-column of the multiple sub-columns.

8. The method of claim 5, further comprising:

locating a record in storage using an indexing attribute of the at least one indexing attribute and a matching attribute of the one or more matching attributes; and updating the record in storage that is located.

9. The method of claim 8, wherein the locating includes:

using the indexing attribute to locate a bucket of records to which an incoming record pertains; and using the matching attribute to perform matching of the incoming record and one or more records of the bucket of records to locate the record in storage to be updated.

10. The method of claim 1, wherein the providing the indication of the at least one indexing attribute includes storing the indication in storage.

11. The method of claim 1, wherein the automatically generating the one or more indexing attributes includes training at least one machine learning model to select the one or more columns of data to be used in the generating the multiple sub-columns, the training the at least one machine learning model being based on a degree of repeatability of data in the plurality of columns of data, and wherein the generating the multiple sub-columns from the plurality of columns of data includes using the at least one machine learning model that is trained to select the one or more columns of data from which the multiple sub-columns are generated.

12. The method of claim 1, wherein the automatically generating the one or more indexing attributes further comprises automatically evaluating, at least, the multiple sub-columns generated from the plurality of columns of data for completeness to produce an indication of one or more acceptable sub-columns of the multiple sub-columns, and wherein the selecting from the plurality of columns of data and the multiple sub-columns the at least one indexing column includes selecting from the plurality of columns of data and the one or more acceptable sub-columns the at least one indexing column.

13. A computer system comprising:

at least one computing device;

a set of one or more computer-readable storage media; and program instructions, collectively stored in the set of one or more computer-readable storage media, for causing the at least one computing device to perform computer operations including:

executing on a computing device of a computing environment a process to automatically generate indexes used in entity resolution, the executing the process including:

accessing, using the computing device and at least one network of the computing environment, at least one data structure constructed based on data obtained from one or more sources, the at least one data structure stored in storage of the computing environment and including a plurality of columns of data;

automatically generating, using the computing device and based on the plurality of columns of data, one or more indexing attributes, the automatically generating the one or more indexing attributes comprising:

generating multiple sub-columns from the plurality of columns of data, wherein a sub-column of the multiple sub-columns is a portion of a selected column of data of the plurality of columns of data, and wherein the generating the sub-column from the selected column of data includes separating the selected column of data into a re type sub-column in which the data of the selected column is of a repeatable type and another type of sub-column including other data of the selected column of data; and selecting from the plurality of columns of data and the multiple sub-columns at least one indexing column as at least one indexing attribute of the one or more indexing attributes, the at least one indexing attribute used to generate at least one index configured to reduce a number of records compared and storage requirements by avoiding storing duplicate data within the computing environment; and executing the entity resolution by one or more computing devices of the computing environment using the at least one index generated from the at least one indexing attribute.

14. The computer system of claim 13, wherein the generating the multiple sub-columns comprises:

automatically searching the plurality of columns of data for a column that includes a selected delimiter, the column being the selected column of data; and automatically splitting the column at the selected delimiter creating the multiple sub-columns, wherein one sub-column includes column data prior to the selected delimiter and another sub-column includes other column data subsequent to the selected delimiter.

15. The computer system of claim 13, wherein the automatically generating further comprises:

generating one or more column combinations based on the one or more sub-columns of the multiple sub-columns and the plurality of columns of data; and wherein the selecting includes selecting the at least one indexing column from the plurality of columns of data, the one or more sub-columns and the one or more column combinations.

16. The computer system of claim 13, wherein the computer operations further comprise:

locating a record in storage using an indexing attribute of the at least one indexing attribute and a matching attribute of one or more matching attributes to be used in the entity resolution; and updating the record in storage that is located.

17. A computer program product comprising:

a set of one or more computer-readable storage media; and program instructions, collectively stored in the set of one or more computer-readable storage media, for causing at least one computing device to perform computer operations including:

executing on a computing device of a computing environment a process to automatically generate indexes used in entity resolution, the executing the process including:

accessing, using the computing device and at least one network of the computing environment, at least one data structure constructed based on data obtained from one or more sources, the at least one data structure stored in storage of the computing environment and including a plurality of columns of data;

automatically generating, using the computing device and based on the plurality of columns of data, one or more indexing attributes, the automatically generating the one or more indexing attributes comprising:

generating multiple sub-columns from the plurality of columns of data, wherein a sub-column of the multiple sub-columns is a portion of a selected column of data of the plurality of columns of data, and wherein the generating the sub-column from the selected column of data includes separating the selected column of data into a repeatable-type sub-column in which the data of the selected column is of a repeatable type and another type of sub-column including other data of the selected column of data; and selecting from the plurality of columns of data and the multiple sub-columns at least one indexing column as at least one indexing attribute of the one or more indexing attributes the at least one indexing attribute used to generate at least one index configured to reduce a number of records compared and storage requirements by avoiding storing duplicate data within the computing environment; and executing the entity resolution by one or more computing devices of the computing environment using the at least one index generated f rom the at least one indexing attribute.

18. The computer program product of claim 17, wherein the generating the multiple sub-columns comprises:

automatically searching the plurality of columns of data for a column that includes a selected delimiter, the column being the selected column of data; and automatically splitting the column at the selected delimiter creating the multiple sub-columns, wherein one sub-column includes column data prior to the selected delimiter and another sub-column includes other column data subsequent to the selected delimiter.

19. The computer program product of claim 17, wherein the automatically generating further comprises:

generating one or more column combinations based on one or more sub-columns of the multiple sub-columns and the plurality of columns of data; and wherein the selecting includes selecting the at least one indexing column from the plurality of columns of data, the one or more sub-columns and the one or more column combinations.

20. The computer program product of claim 17, wherein the computer operations further comprise:

locating a record in storage using an indexing attribute of the at least one indexing attribute and a matching attribute of one or more matching attributes to be used in the entity resolution; and updating the record in storage that is located.

* * * * *